(No Model.) 3 Sheets—Sheet 1.
W. E. ANDERSON.
COMBINED PLOW AND POTATO DIGGER.
No. 450,128. Patented Apr. 14, 1891.
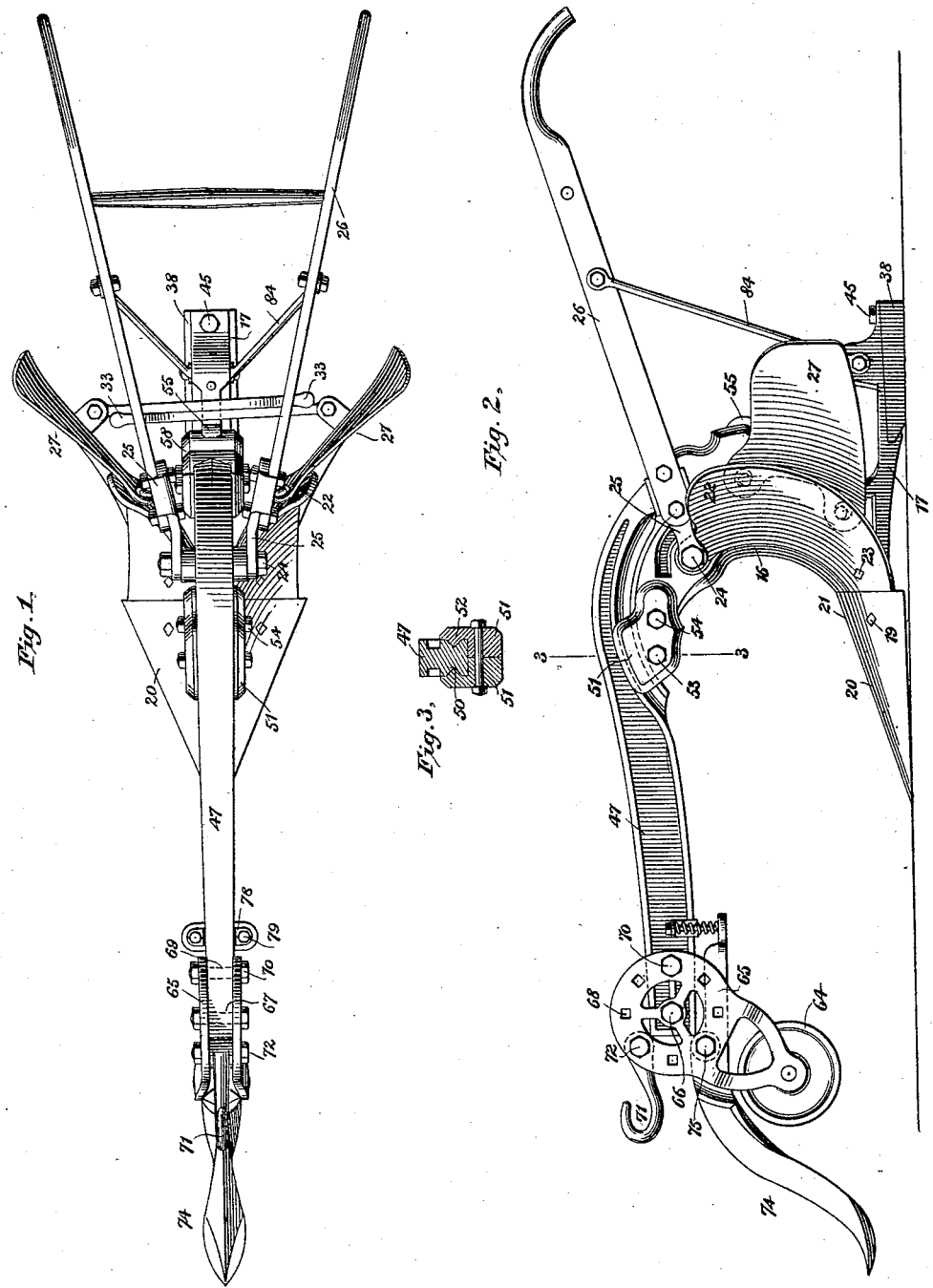
Witnesses
Geo. W. Breck
Henry W. Lloyd.
Inventor
Wm. E. Anderson.
By his Attorneys
Fowler & Fowler (No Model.) 3 Sheets—Sheet 2.
W. E. ANDERSON.
COMBINED PLOW AND POTATO DIGGER.
No. 450,128. Patented Apr. 14, 1891.
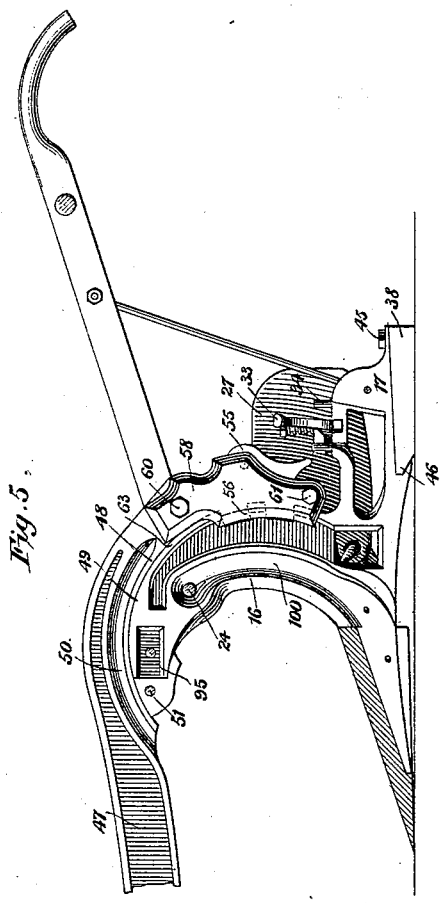
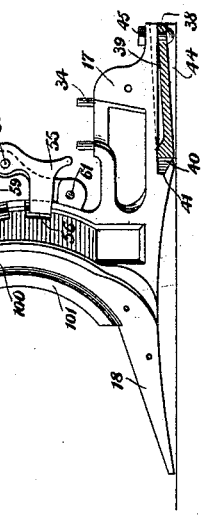
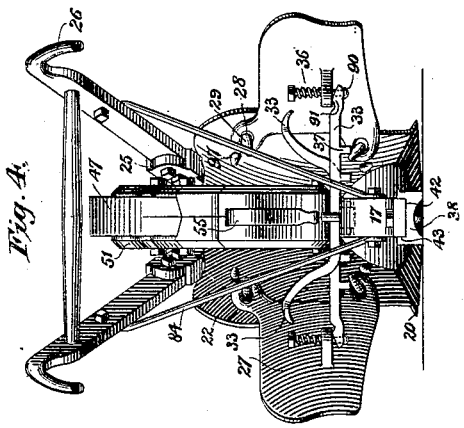
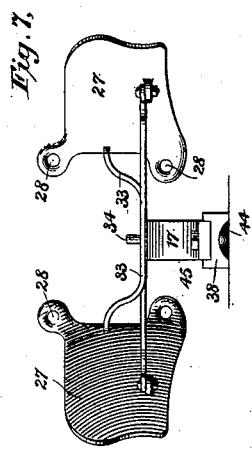
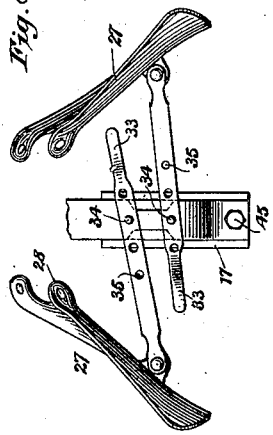
Witnesses
Geo. W. Breek
Henry W. Lloyd.
Inventor
Wm E. Anderson,
By his Attorneys
Fowler & Fowler

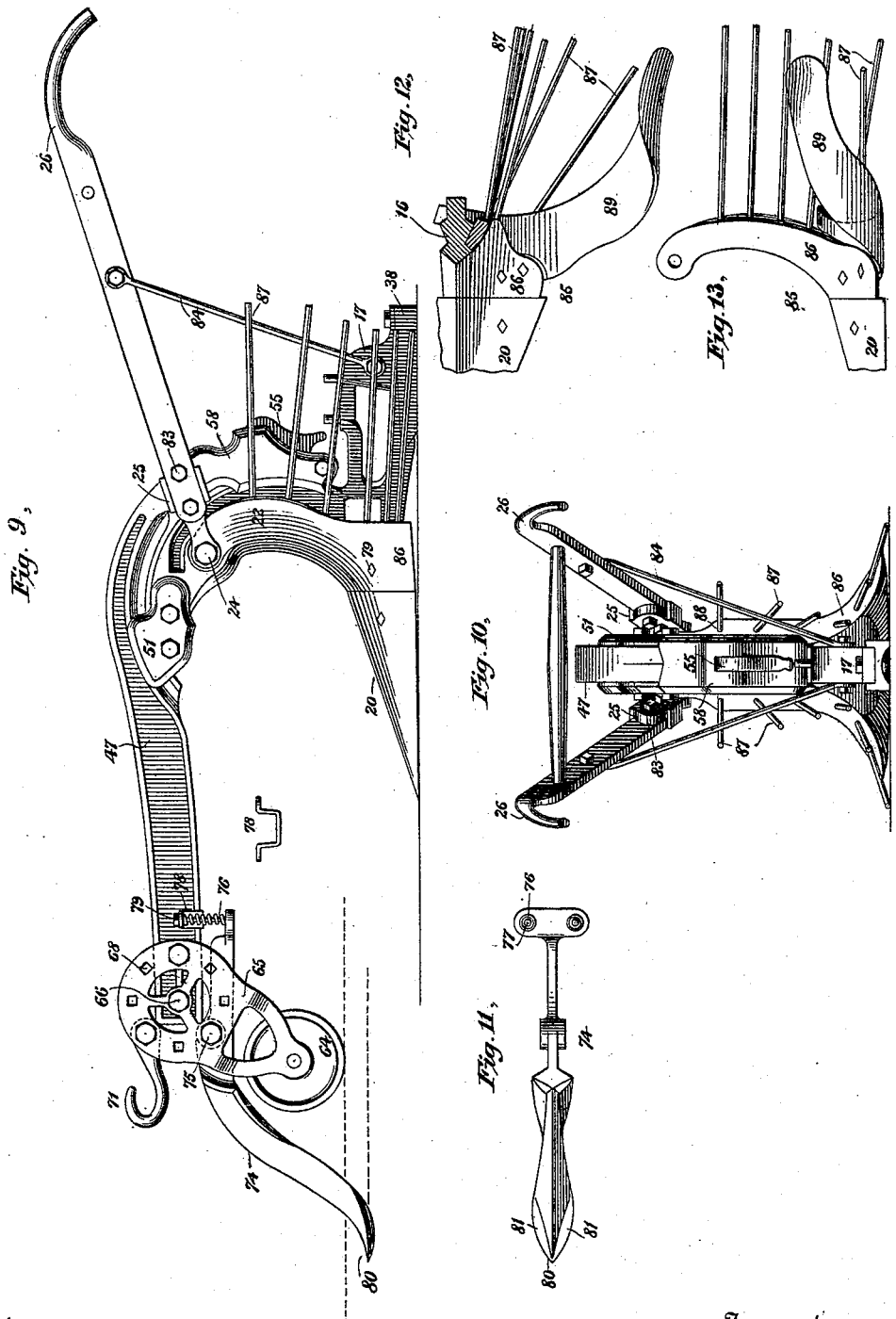

UNITED STATES PATENT OFFICE.

WILLIAM E. ANDERSON, OF FREWSBURG, NEW YORK.

COMBINED PLOW AND POTATO-DIGGER.

SPECIFICATION forming part of Letters Patent No. 450,128, dated April 14, 1891.

Application filed October 15, 1890. Serial No. 368,188. (No model.)

*To all whom it may concern:*

Be it known that I, WILLIAM E. ANDERSON, a citizen of the United States, residing at Frewsburg, county of Chautauqua, State of New York, have invented certain new and useful Improvements in Plows, of which the following is such a full, clear, and exact description as will enable any one skilled in the art to which it appertains to make and use the same, reference being had to the accompanying drawings, forming part of this specification.

My invention relates to a combined shovel-plow and potato-digger, which by interchanging certain parts thereof may be readily used as a plow or as a potato-digger; and the invention consists in the certain novel and peculiar arrangements and combinations of parts, all as more fully hereinafter described, and then pointed out in the claims.

In the accompanying drawings, illustrating my invention, and wherein like numbers of reference designate like parts throughout, Figure 1 is a top plan view of my improved shovel-plow, and Fig. 2 is a side view of the same. Fig. 3 is a cross-sectional view of the plow-beam and the clamp for holding it to the head of the plow of the main frame, the plane of the section being indicated by line 3 3 in Fig. 2. Fig. 4 is a view of the rear end of the plow. Fig. 5 is a side view of the plow with parts thereof removed and the share-point in section, with the plow-beam broken away. Fig. 6 is a side view of the main frame, together with the plow-beam, and the device for automatically locking it to the main frame, the beam being broken away. Fig. 7 is a detached rear view of the hinged mold-boards with their adjusting devices, and Fig. 8 is a top plan view of the same. Fig. 9 is a side view of the apparatus, in which the shares and hinged mold-boards of the shovel-plow proper are replaced by the potato-digger attachment. This view also shows my improved colter attached to the plow-beam. Fig. 10 is a rear end view of the potato-digger shown in Fig. 9. Fig. 11 is a top plan view of the colter detached. Figs. 12 and 13 are detached detail views of a modified form of the potato-digger attachment.

Referring to the drawings, 16 designates the main frame of the combined apparatus. The plow-beam is formed at its base with a rearward extension 17 and a forwardly-projecting tapered extension 18, over which latter is fitted and securely bolted thereto by means of bolts 19 the plowshare-point 20, which is pointed at its forward end, and is formed with two inclined upper faces 21, the plan of the point being triangular in shape, as shown in Fig. 1. The bottom of the share-point 20 inclines downwardly from its attaching end to its extreme point, as indicated more particularly in Figs. 2, 5, and 9, so that the tendency of the point is to descend into the ground, which, however, is prevented by reason of the plow being supported by the gage-wheel and the shoe of the plow, hereinafter to be described. The point lies flat on the ground, cutting equally upon both sides, and is of such construction that it renders the draft easier and smoother, and also makes it easier for the operator to handle the plow.

Upon each side of the main frame near its forward edge is fixed a plow share 22, which is of the general shape shown, and is secured in position by means of a bolt 23 at the base and the bolt 24 at the upper end thereof, which latter bolt extends through an opening in the main frame and passes through each of the shares, and, in addition to holding the upper ends of the shares in place, also serves to secure in position the holders 25 of the plow-handles 26. The front edge of each of the plow shares 22 fits snugly into a curved groove 100, so that the outer face thereof comes flush with the inclined face 101 of the forward cutting-edge of the main frame, the groove 100 upon each side of the frame forming a rib or raised portion, one side of which is beveled off to form the inclined face 101, as will be fully understood from Figs. 5 and 6.

The plowshares 22 are placed at a suitable angle to each other, and to the rear curved edge of each of them is hinged or suitably pivoted an adjustable mold-board 27. In the present construction the mold-boards are hinged to the plowshares by means of suitable perforations 28, formed in the boards, for receiving the hooks or pintles 29, which are formed upon the backs of the shares, being integral therewith, if preferred. A lug or knob 97 is located on the back of the share near each of the hooks 29, and serves to keep the hinge-eyes 28 of the mold-board from slipping off the hooks. By this method of hinging the mold-boards they may be readily detached from the shares. The mold-boards are suitably curved, so as to throw the soil off to the side of the plow, and are provided with means for adjusting them so that they can be set at any desired angle relatively to the plowshares. The adjusting means for the mold-boards each consists in a hand lever or rod 33, which is pivoted at one end to the mold-board and extends across the rear extension 17 of the main frame, with which it may be locked in different adjustments by means of a pin 34 projecting from the frame and a series of perforations or openings 35, formed in the hand-lever at different points along the length thereof. The adjusting-levers 33 extend about horizontally, though of course they may assume any preferred position, and are each provided with a spring 36, which tends to force them into locked position. The spring for forcing the lever into locked position may be applied in different ways. However, in the construction shown, this spring is in the form of a spiral spring, which surrounds a rod 90, fixed upon the end of the lever, which rod works loosely through an ear projecting from the mold-board, so that the spring may with its lower end engage the ear, while the other end thereof may engage a stop or nut upon the upper end of the rod. Thus the spring always tends to draw the rod upward, so as to raise the adjacent end of the lever and depress the other end into locking position, the lever being provided with a projection 91, which engages the under side of the ear on the mold-board and acts as a fulcrum for the spring. The free ends of these levers are curved upwardly, so as to afford a suitable handle for manipulating the levers. These levers are shown in locked position. By raising them so as to clear the pins 34 they may be reset by moving them so that the pin will enter another one of the holes 35, thereby readjusting the mold-board either to form a greater or a less angle with the adjacent shaft, accordingly as the perforation is nearer to or farther away from the end of the lever.

In the construction shown in Figs. 7 and 8 the adjusting-rods 33 are fastened to a rigid ear projecting from the inner face of the mold-board by means of a vertical bolt on which the rod has a slight horizontal movement to permit the setting of the mold-board at different angles. The rods are made of spring metal, so that they always tend to hold themselves firmly seated in locked position. They may be readily unlocked from the pins 34 by raising their free ends clear of the pins. Instead of using the perforated levers or bars 33 and the pins 34, the levers may be formed upon their under sides with projections or teeth 37, forming a rack which engages and locks with the upper edge of the extension 17, as will be understood from Figs. 4 and 5. However, I prefer to use the form of adjusting means shown in Figs. 7 and 8, though both forms will be found to be very easy to handle and keep in order, and they can be readily and quickly adjusted without the use of a wrench or key.

The shoe 38 is secured upon the under side of the extension 17 of the main frame, the extension being cut away at 39 to receive the body of the shoe. The toe of the shoe is forked at 40, so as to span the shoulder 41 upon the base of the extension 17, over which the shoe is fitted, and the under side of the toe is inclined at 46. The upper side of the shoe is formed at each long edge thereof with a flange 43, which fits against the sides of the extension 17, and the bottom of the shoe is hollowed out along the entire length of the same. The outer end or heel of the shoe is secured to the extension 17 by means of a bolt 45, which serves to hold it securely in place, the forward end or toe of the shoe being held fast by the shoulder 41, while the shoe is prevented from moving sidewise by the flanges 43, before described. This shoe is removable, and being hollowed or curved lengthwise upon its under surface it tends to make the plow run steadily. It is to be constructed of a suitable metal, as are nearly all parts of the apparatus, to withstand the wear which it is subjected to. By having the shoe removable it can be readily replaced by a new one when it wears out.

The plow-beam 47 is mounted adjustably upon the upper part of the main frame 16, which latter is preferably made in a single piece of metal. The end of the plow-beam 47, which is secured to the frame, is curved or bowed at 48, in order to fit the curved back or upper side 49 of the main frame upon which it is mounted and on which it may be slid back and forth on its length, so as to be adjusted in different positions, as will be described. Upon each side of the plow-beam 47 is formed a groove 50, which is curved like the beam, so as to be the same distance from the edge thereof at all points of the groove. A guide-plate 51 is mounted upon each side of the head of the main frame and is provided with a rib or projection 52 upon its inner face, which rib is designed to extend into the groove 50 upon the side of the plow-beam. The two guide-plates 51 are secured together at their outer ends by a bolt 53 and are both made fast at their inner ends to the main frame by means of the bolt 54. In order to hold these plates firmly in position, a recess 95 is formed in each side of the main frame 16, and the plates are fitted into these recesses at their inner ends. These plates serve as a guide for the plow-beam when the same is moved on its length for adjustment, and at the same time they serve to securely hold the beam to the main frame, acting to take up the lateral strain on the beam as well as to receive the draft. The plow-beam is held in adjustment on its length by means of a spring or snap lock 55, which is adapted to lock with a series of notches 56, formed upon the curved back of the main frame 16. This spring-lock 55 is pivoted at 57 in a frame 58 and is provided with a spring 59 for automatically throwing it into action. The frame 58 consists of two plates, which are pivoted at their upper ends to the plow-beam by means of the bolt 60, and are pivoted together at their lower ends by means of the bolt 61. Each of the plates of the frame 58 is formed upon its inner side with a curved rib 62, which engages with a lip 63, formed upon each side of the main frame, the rib and the lip serving as a means for holding the plow-beam to the frame, at the same time permitting of the beam being slid on the frame. The beam 47 may readily be adjusted on its length on the frame 16 by withdrawing by hand the latch 55, so as to unlock the parts, and then sliding the beam lengthwise on the frame until the latch comes opposite another notch 56 in the frame, when the latch will automatically snap into the notch, and so lock the beam in adjusted position. By having the plow-beam separate from the main frame of the plow and adjustably secured thereto I provide a ready way of varying the line of draft on the plow so as to vary the size of the furrow cut by the plow.

The gage-wheel 64, the adjustment of which serves to regulate in a well-known way the depth of the furrow, is mounted upon a bracket or hanger 65, which is swung upon the draft end of the plow-beam 47 by means of a shaft 66, which passes through a hollow 67 in the beam. The hanger 65 may be rotated on the shaft or pin 66, so as to raise or lower the gage-wheel in an obvious manner, and the hanger in the present construction consists in two members or plates located one upon each side of the plow-beam and secured together by the shaft or pin 66 and the shaft of the gage-wheel 64. A series of openings 68 are formed in each of the plates of the hanger at equal distances from the center, about which the hanger may be turned, and these openings register with each other, and the hanger may be turned so as to bring them in alignment with an opening 69, formed in the plow-beam 47. A removable bolt or pin 70 is designed and adapted to be passed through the openings 68 in the hanger and the opening 69 in the plow-beam, so as to lock the hanger against movement on its shaft 66. By this construction the hanger may be set in different positions relatively to the plow-beam, and the gage-wheel may thereby be adjusted so as to regulate the depth of the furrow.

The draft-hook 71 is mounted upon a removable pin 72, which is placed through the openings 68 of the hanger 65. As the mounting of this hook may be changed readily from one of the openings 68 to another, the direction of the draft-line may be accordingly changed as desired. A colter 74 is mounted upon the forward end of the plow-beam in such a manner as to yield vertically to any obstructions it may encounter in its work. In the present construction this colter consists in a bent arm, with a portion thereof extending horizontally under the forward end of the plow-beam and the other portion inclining forwardly down to the ground and serving as the cutting-blade, and is pivoted by means of the bolt 75 to the hanger 65, which carries the gage-wheel 64. The pivot-bolt 75 of the colter is mounted in the opening 68 of the hanger, and the inner end of the colter, which extends under the plow-beam, is yieldingly connected to the same through means of the springs 76, which surround the rods 77, fixed upon the colter and extending through perforations in a yoke 78, secured to the plow-beam. The ends of the springs 76 abut against the lower face of the yoke 78 and the upper face of the end of the colter, respectively, so that as the colter is tilted or rocked on its bearings 75 the springs 76 may be brought into play. The rods 77, which are connected with the inner end of the colter and extend through the spiral spring 76 and pass loosely through the yoke 78, are limited in their downward movement on the yoke by means of the caps or heads 79, so that when these caps are in contact with the yoke, as shown in the drawings, the outer end of the colter cannot be raised any farther, as it is then at its upper limit of movement. The cutting end of the colter is formed with a forwardly-projecting point 80, and is considerably broadened out and beveled at 81. This colter, when used with the potato-digger, hereinafter to be described, moves considerably in advance of the plowshare-point and serves to divide and break the potato-hills, and also to prevent the weeds from getting under the plow-beam.

The combined apparatus is provided with the usual handles 26, each of which is secured by means of bolts 83 to a holder 25, hereinbefore described. From each handle there extends a brace-rod 84 to the rear end of the extension 17 of the main frame.

In order to change the apparatus from a plow proper to the potato-digger, the digger attachment 85, which is now to be described, is substituted for the plowshare 22 and the mold-board 27 at each side of the apparatus, as shown in Figs. 9 and 10. My improved potato-digger attachment consists, essentially, in a share-plate 86, which forms the frame for supporting the separating or catch fingers 87, which extend rearwardly and outwardly from the same in more or less inclined directions, the arrangement and direction in which the fingers may project being a matter of preference. The frame or plate 86 of the potato-digger attachment, which when in use constitutes a plowshare, is shaped in the general manner shown in Figs. 9, 10, 12, and 13, and is bolted in the same position as the plowshare 22, which it replaces, by means of the bolts 24 and 79. In the present construction the catch-fingers 87 of the digger are secured directly to the rear edge of the plate 86, and they may consist in metallic rods with screw-threaded ends, which are screwed into suitable screw-threaded openings 88, formed in the edge of the plate 86. If preferred, the fingers 87 may be formed in one piece with the frame 86, though it is obviously preferable to have them made separate therefrom, so that in case of their breaking they can be replaced without necessitating the replacement of the entire attachment. There may be as many of the fingers 87 as will be necessary, and they are to be arranged in a manner which will secure the best results, the arrangement of corresponding fingers upon each side of the apparatus being substantially alike.

In a modified form of the digger attachment 85 I use a scoop plate or arm 89, which is secured to the frame 86, near the bottom thereof, and is of a curved form, extending rearwardly and upwardly, thence again rearwardly, so as to lie partly below and forward of the fingers 87, as will be understood from Figs. 12 and 13. The scoop-plate 89 is also provided with digger-fingers 87, which extend rearwardly therefrom and act in conjunction with the fingers on the plate 86 to separate the potatoes from the soil as the same is forced against the fingers in the forward movement of the machine, the soil being plowed up and broken by the point 20 and the share-plate 86 before it is encountered by the fingers. The scoop-plate 89 may be used or not, as desired, and its use depends somewhat upon the nature of the soil to be worked. This digger attachment operates with great ease and performs its work with great regularity.

The different parts of the apparatus are to be made of metal as ordinarily used in making plows and similar devices, some of the parts being made of cast-iron, while others are made of wrought-iron or steel.

I desire it to be understood that I do not confine myself to the particular constructions herewith shown and described, since the scope of my invention is such as to admit of various modifications of the different parts of the apparatus without departing from the spirit of the invention.

Having thus described my improvements in a combined shovel-plow and potato-digger, what I claim as my invention, and desire to secure by Letters Patent, is—

1. In a plow, the combination, with a curved main frame and a curved plow-beam adjustably mounted thereon and fitted thereto, of a tongue-and-groove joint formed between the said beam and frame and extending in a direction longitudinally of the beam, whereby the latter may be slid lengthwise on the frame to adjust it, and a lock for locking the beam to the frame in adjusted position.

2. The combination, with a main frame of a plow, formed with a groove at each side near the front edge thereof, such as a groove 100, of plowshares mounted upon the frame and having the front edge of each fitted into the said groove, substantially as and for the purpose set forth.

3. The combination, with the main frame of a plow provided at each side, near the front edge thereof, with a groove, such as a groove 100, of the plowshares 22, having the front edges thereof fitted into said grooves, and a bolt 24 for securing the shares to the frame at the upper ends thereof, substantially as and for the purpose set forth.

4. The combination, with the main frame of a plow, of the plowshares arranged at each side thereof, and a bolt, such as 24, passing through the said frame and securing the upper ends of the shares thereto, holders 25 25 for receiving the plow-handles, the holders being also mounted upon and secured in position by the said bolt 24.

5. The combination, with a swinging adjustable mold-board, of a spring-actuated adjusting-lever hinged to the mold-board, and a catch for holding the lever locked in adjusted position, the spring tending to force the lever into locked position.

6. In a plow, the combination, with a main frame provided upon each side thereof with a rib or shoulder, of a plow-beam adjustably mounted on the frame and formed upon each side with a rib or shoulder, guide-plates secured upon the main frame and provided with ribs interlocking with the ribs or shoulders upon the beam, guide-plates secured to the end of the beam and provided with ribs interlocking with the ribs or shoulders on the main frame, and a lock for locking the beam to the frame, substantially as and for the purpose set forth.

7. In a plow, the combination, with a plow-beam, of a gage-wheel hanger pivoted to the plow-beam on a horizontal axis and adjustable thereon, and means for locking it in adjusted position, a colter pivoted to the hanger and provided with springs for resisting its movement on its pivot, for the purpose set forth.

8. In a plow, the combination, with a plow-beam, of a pivoted colter adapted to rock vertically, and consisting, essentially, in a bent arm pivoted near the bend with one end thereof extending under the plow-beam and provided at such end with a spring or springs intermediate the end of the colter and the plow-beam, the other end thereof being formed into a blade, substantially as and for the purpose set forth.

9. In a plow, the combination, with the plow-beam, of a colter 74, pivotally mounted upon the beam on a horizontal axis and provided with springs 76 intermediate the plow-beam and the colter for resisting the movement of the latter, substantially as and for the purpose set forth.

10. In a plow, the combination, with the plow-beam, of the colter 74, pivoted on a horizontal axis to the plow-beam and provided at its inner end with the rods 77, a yoke 78, secured upon the plow-beam and formed with perforations through which the rods 77 loosely pass, caps or heads 79 for the rods 77, and springs 76, surrounding the rods and interposed between the end of the colter and the yoke, substantially as and for the purpose set forth.

11. In a plow, the combination, with the plow-beam, of a gage-wheel provided with a hanger detachably mounted upon the plow-beam, and a colter mounted upon the hanger, substantially as and for the purpose set forth.

12. In a plow, the combination, with the plow-beam, of the gage-wheel 64 and the hanger 65 therefor, mounted on a horizontal shaft on the plow-beam and capable of adjustment about said shaft, the colter 74, pivoted at 75 to the said hanger, and a spring or springs for resisting the movement of the colter on its pivot 75, substantially as and for the purpose set forth.

13. In a plow, the combination, with the main frame 16, provided with a rearward extension 17, formed with a shoulder 41 upon the bottom thereof, of a shoe 38, formed with a notched toe 40, engaging the shoulder 41, and a bolt 45 for detachably securing the shoe in position, substantially as and for the purpose set forth.

14. In a plow, the combination, with a main frame, of a plow-beam 47, adjustably mounted upon the frame and provided with a spring or snap lock 55 for locking the beam to the frame, substantially as and for the purpose set forth.

15. In a plow, the combination, with a main frame 16, of a plow-beam 47, mounted adjustably upon the frame and provided upon each side with a rib, a lock 55 for locking the beam to the frame, and guide-plates 51, mounted upon the upper end of the main frame and provided with inwardly-projecting lips adapted to engage with the ribs on the plow-beam to form a sliding joint, substantially as and for the purpose set forth.

16. In a plow, the combination, with a main frame 16, formed upon each side thereof with a rib 63, of a plow-beam 47, formed upon each side thereof with a groove 50, a guide-plate 51, secured upon each side of the main frame and provided with a rib or projection taking into the groove 50 of the plow-beam, a frame 58, attached to the plow-beam and provided with a spring-lock 55 for engaging and locking with the main frame, and the frame 58 of the lock, comprising two plates removably secured together and each provided with an inwardly-projecting lip for engaging with the rib 63 on the main frame to form a sliding joint therewith, substantially as and for the purpose set forth.

17. In a plow, the combination, with an adjustable mold-board, of a spring-metal adjusting-lever 33 hinged thereto and formed with locking-openings, such as the openings 35, and a fixed pin 34, adapted to engage with any one of the said locking-openings of the lever at will, the said lever snapping into locking engagement with the pin by reason of its resiliency, substantially as and for the purpose set forth.

In testimony whereof I have hereunto set my hand, this 10th day of October, 1890, in the presence of the two subscribing witnesses.

WILLIAM E. ANDERSON.

Witnesses:
OLOF A. OLSON,
V. E. PECKHAM.